US012793144B2

(12) United States Patent
Davis et al.

(10) Patent No.: US 12,793,144 B2
(45) Date of Patent: Nov. 10, 2026

(54) ELECTRONIC DEVICE DATA CAPTURE FOR PROPERTY INSURANCE QUOTES

(71) Applicant: STATE FARM MUTUAL AUTOMOBILE INSURANCE COMPANY, Bloomington, IL (US)

(72) Inventors: Timothy Joel Davis, Warrenville, IL (US); Amy Engelhorn, Normal, IL (US); Colby S. Kornelis, Downs, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/962,211

(22) Filed: Nov. 27, 2024

(65) Prior Publication Data

US 2025/0095077 A1 Mar. 20, 2025

Related U.S. Application Data

(63) Continuation of application No. 18/215,154, filed on Jun. 27, 2023, now Pat. No. 12,165,215, which is a (Continued)

(51) Int. Cl.
*G06Q 40/08* (2012.01)
*G06Q 10/087* (2023.01)

(52) U.S. Cl.
CPC .......... *G06Q 40/08* (2013.01); *G06Q 10/087* (2013.01)

(58) Field of Classification Search
CPC ... G06Q 40/08; G06Q 40/086; G06Q 40/0861
(Continued)

(56) References Cited

U.S. PATENT DOCUMENTS 10,311,302 B2 6/2019 Kottenstette et al.
10,366,288 B1 7/2019 Kottenstette et al.
(Continued)

OTHER PUBLICATIONS

Wikipedia, User Interface, Captured by Internet archive WayBack Machine on Sep. 30, 2005 (Year: 2005).
(Continued)

*Primary Examiner* — Cho Yiu Kwong
(74) *Attorney, Agent, or Firm* — MARSHALL, GERSTEIN & BORUN LLP

(57) ABSTRACT

Systems and methods for capturing digital image data associated with a property for an insurance quote are described. According to certain aspects, a mobile device may enable a user to capture digital image data and/or a video stream and other information of house features and characteristics that may be used to determine insurability and estimated replacement cost of the property. The mobile device may enable the user to capture the information at the property location, which may eliminate the need for a manual assessment or characterization of home features by a homeowner. A back-end server may receive the data, analyze the data to generate an insurance quote (and/or insurance application) for the property, and transmit the insurance quote (and/or application) to the mobile device for presentation to the user. The mobile device may enable the user to select terms, deductibles, limits, and/or coverages, and ultimately approve a homeowner's insurance policy.

20 Claims, 7 Drawing Sheets

Related U.S. Application Data continuation of application No. 17/734,329, filed on May 2, 2022, now Pat. No. 11,715,162, which is a continuation of application No. 16/211,666, filed on Dec. 6, 2018, now Pat. No. 11,348,180, which is a continuation of application No. 14/987,062, filed on Jan. 4, 2016, now Pat. No. 10,210,577.

(60) Provisional application No. 62/149,253, filed on Apr. 17, 2015.

(58) Field of Classification Search
USPC .............................................................. 705/4
See application file for complete search history.

(56) References Cited

U.S. PATENT DOCUMENTS

| | | | |
|---|---|---|---|
| 10,643,072 | B2 | 5/2020 | Kottenstette et al. |
| 11,151,378 | B2 | 10/2021 | Kottenstette et al. |
| 11,210,552 | B2 | 12/2021 | Kossyk et al. |
| 11,222,426 | B2 | 1/2022 | Richter et al. |
| 11,232,150 | B2 | 1/2022 | Vianello et al. |
| 11,367,265 | B2 | 6/2022 | Vianello et al. |
| 2009/0265193 | A1* | 10/2009 | Collins .............. G06Q 30/0185 901/46 |
| 2010/0067745 | A1 | 3/2010 | Kovtun et al. |
| 2010/0082842 | A1 | 4/2010 | Lavrov et al. |
| 2022/0253948 | A1 | 8/2022 | Davis et al. |

OTHER PUBLICATIONS

Wikipedia, Camera Phone, Captured on Dec. 26, 2008 by Internet Archive WayBack Machine (Year: 2008).

* cited by examiner

300

Walk-through of Property

| SEQUENCE NUMBER | ROOM / SECTION / FACILITY |
|---|---|
| 1 | Exterior of house |
| 2 | Exterior of outbuilding(s) |
| 3 | Kitchen |
| 4 | Bedroom A (or Master Bedroom) |
| 5 | Bedroom B |
| 6 | Bedroom C |
| 7 | Bathroom A (or Master Bathroom) |
| 8 | Bathroom B |
| 9 | Kitchen |
| 10 | Dining Room |
| 11 | Living Room |
| 12 | Family Room |
| 13 | Garage |
| 14 | Outbuilding(s) - Shed, etc. |

FIG. 3

ELECTRONIC DEVICE DATA CAPTURE FOR PROPERTY INSURANCE QUOTES

CROSS-REFERENCE TO RELATED APPLICATIONS

This application is a continuation of U.S. patent application Ser. No. 18/215,154, now U.S. Pat. No. 12,165,215, filed Jun. 27, 2023 and entitled "ELECTRONIC DEVICE DATA CAPTURE FOR PROPERTY INSURANCE QUOTES", which is a continuation of U.S. patent application Ser. No. 17/734,329, now U.S. Pat. No. 11,715,162, filed on May 2, 2022 and entitled "ELECTRONIC DEVICE DATA CAPTURE FOR PROPERTY INSURANCE QUOTES", which is a continuation of U.S. patent application Ser. No. 16/211,666, now U.S. Pat. No. 11,348,180, filed on Dec. 6, 2018 and entitled "ELECTRONIC DEVICE DATA CAPTURE FOR PROPERTY INSURANCE QUOTES", which is a continuation of U.S. patent application Ser. No. 14/987,062, now U.S. Pat. No. 10,210,577, filed on Jan. 4, 2016 and entitled "ELECTRONIC DEVICE DATA CAPTURE FOR PROPERTY INSURANCE QUOTES", which claims benefit of the filing date of U.S. Provisional Patent Application No. 62/149,253, filed Apr. 17, 2015 and entitled "ELECTRONIC DEVICE DATA CAPTURE FOR PROPERTY INSURANCE QUOTES". These disclosures are hereby incorporated by reference in their entireties.

FIELD OF THE DISCLOSURE

The present disclosure generally relates to capturing data pertaining to insurance quotes for homeowners or other property owners via a digital imaging application utilizing an electronic device. More particularly, the present disclosure relates to systems and methods for capturing and translating digital image data and other inputs (e.g., voice and/or text) into data points to identify, measure, qualify, and count structural elements, household fixtures, and personal property.

BACKGROUND

Preparing insurance quotes for property insurance coverage may typically require an insurance agent or other insurance provider representative to visit the property in person. The agent may have to evaluate exterior factors, such as roof style, building construction (e.g., frame, brick, siding), and outbuildings. The agent may also need to evaluate and catalog interior components, such as appliances, furniture, and other personal possessions of the property owner. The availability of agents may significantly affect the timeliness of the insurance quote.

In other situations, the property owner may never complete an inventory of personal items for insurance coverage, which may result in uncompensated losses in the event of a loss event. Accordingly, there is an opportunity to expedite property insurance quoting and to expand the capacity of the agent in order to gain more new customers and to serve them in a more timely and efficient manner.

SUMMARY

The present embodiments may relate to, inter alia, obtaining structure data, personal property data, and/or replacement cost information through a mobile phone-based video application that uses object recognition, location awareness (i.e., "location services"), measurement functionality and augmented reality interaction/feedback (e.g., computer-generated, interactive visual elements on the screen of a mobile device, overlaying the live video image being captured). Continuous video (or a continuous video stream) may capture and translate images into data points to identify, measure, qualify, count structural elements, household fixtures and/or personal property (see exemplary mobile application mock-ups for video capture depicted in FIG. 5).

Location awareness from the mobile device may be used as a substitute for the entry of a Risk Location Address, and thus, as the basis for a determination of location eligibility. An awareness of the exact location may also be used as an input to determining the progress of the overall process (i.e., estimate of number of remaining rooms in which to capture video, as a function of an estimate of square footage/number of stories from exterior video). Location awareness from the mobile device may also be used for location verification.

The mobile device may also be used for progress feedback to the user (i.e. "You are 75% complete with your video walk-through. We suggest capturing your second floor rooms next"). The progress feedback may be audible, haptic, and/or visual. This progress feedback may be supplemented by indicating which objects the application had completely assessed/identified, versus those that are still ambiguous, such as by using an augmented reality overlay of computer generated icons (such as check mark icons) on top of the video feed that appears on the screen of the mobile device. This type of feedback could indicate to users the need to move closer to an object and/or part of the room, increase lighting, linger for a longer time on a given room, steady their shot, etc.

The data and images captured may be used for several purposes, such as establishing the basis for an "Estimated Replacement Cost Value" (for the primary structure, any detached structures, and personal property); filling a virtual form (such as insurance application, a webpage, or other virtual form) in order to generate an insurance quote; and/or for cataloguing a customer's possessions in order to make claim adjustment and replacement simpler for both the customer and the insurance company. Capture of exterior video on a property may also allow for the identification and evaluation of detached structures, as well as potential underwriting and safety concerns. These underwriting and safety concerns could be communicated to whichever party is interested (e.g., to be used in eligibility determinations, or signally to customers as issue to remediate). Videos that return ambiguous concerns could be sent to sales associates and/or underwriters for closer investigation.

This process may be used as a substitute for an inspection/underwriting survey process. The "virtual inspection" video captured by the user may even be more thorough (and subject to further auditing) than an inspection report from a 3$^{rd}$ party vendor, sales associate, or aerial imagery service.

Unusual patterns, combinations, and unconventional materials and construction types may be used as the basis for triggering traditional inspections of properties. Allowing customers to utilize the same data for purposes beyond the initial quote may be an important value-add, particularly in the following ways: security analysis of the property (inadequate safety features, plants too close to house or doorways, non-structural fire hazards, out-of-date safety devices, furniture/fixtures not amenable to young children or animals); personal property replacement inventory; and/or allowing sales associates and underwriters to have access to the video, including the ability to scrub through the video to visually-highlighted/flagged items of concern within the timeline of the video for quick assessment of ambiguities or issues.

The present embodiments may represent a significant process improvement for non-English speakers, avoiding the difficulty of either reading or translating the insurance- or construction industry-specific jargon involved in the process. Commercial properties may be a particularly strong application as well, as they are particularly difficult to underwrite properly.

An enhancement to this application may involve using the preferred language of the device to automatically translate the written feedback appearing on screen. The data captured may also be used as the basis for offering other relevant products. For example, if the video capture reveals a larger-than-normal amount of high-value goods, a Personal Articles insurance policy may be suggested. Even if other policies are not offered, the limits per coverage could be fine-tuned to fit the exact nature of the contents of a household (e.g., a greater number of computers, but no jewelry or furs).

The present embodiments may provide (1) video capture for insurance application question data, for the sake of providing an insurance quote; (2) alternatively, a customer-based underwriting survey/inspection process, which may inform real-time systematic underwriting decisions; (3) video capture for object-based cataloging of personal property and household fixtures; (4) the simultaneous capture and determination of quote data, inspection data, and/or personal property inventory data; (5) real-time feedback about process progress (in video screen format, with augmented reality overlays); (6) substituting (location-aware) video capture for risk location eligibility determinations, identifications of underwriting concerns, and/or capture of spatial measurements; and/or (7) video capture-based product and safety recommendations.

The present embodiments may provide for a faster and more efficient method of processing requests for quotes for homeowners or other property owners. Further, the present embodiments may enable the property owner or other user to capture the physical property characteristics and quantifiable data required for an accurate insurance quote, rather than waiting for the agent to travel to the property to conduct an inspection. The captured data may be used as a basis for an estimated replacement cost value and/or preparing or generating an insurance quote. The data may also be utilized for a security analysis of the property that may list inadequate safety features, fire hazards, out-of-date safety devices, and the like. Further, certain safety concerns may be flagged as requiring an on-site inspection by an agent and may be communicated to the user via the electronic device. Additionally, the present embodiments may provide, as a by-product of the data captured, a personal item inventory list that may be used to file a claim in the event of a loss event. Further, an insurance provider may be able to suggest a personal articles policy if the inventory indicates a higher-than-normal quantity of high-value goods. In addition, coverage limits may be determined by an analysis of the contents of the property.

The present embodiments may leverage an electronic device, such as a mobile device (e.g., smartphone, smart watch, tablet, or laptop), that is operable by a user. The electronic device may be capable of network communication and may include a user interface with various input and output components. The electronic device may be configured to capture and analyze digital image data and to communicate content to the user and receive selections from the user. The embodiments may also utilize a back-end server to perform various analyses and determinations, including determining eligibility for property insurance, data verification, insurance processing, and/or other functionalities.

In one aspect, a computer-implemented method in an electronic device of identifying components within a property for obtaining an insurance quote for a property insurance policy for an individual may be provided. The method may include capturing digital image data by an image sensor of the electronic device. The electronic device may display, as a live preview feature via a user interface of the electronic device, the digital image data captured by the image sensor. The method may include analyzing, using an object detection technique, the digital image data displayed via the user interface to automatically identify a set of components that are associated with the property. The method may also include populating an inventory list with the set of components identified from the digital image data and preparing an application for the property insurance policy, the application indicating the inventory list. In addition, the method may include transmitting, via a communication module of the electronic device, the application to an insurance provider, the insurance provider using the application to generate the insurance quote for the property insurance policy. The method may include additional, less, or alternate actions, including those discussed elsewhere herein.

In another aspect, an electronic device for identifying components within a property for obtaining a quote for a property insurance policy may be provided. The electronic device may include a communication module configured to communicate data, an image sensor, a memory storing a set of computer-executable instructions, and a user interface configured to display content and receive user selections. The electronic device may also include a processor adapted to interface with the communication module, the memory, and the user interface. The processor may be configured to execute the set of computer-executable instructions to cause the processor to: cause the image sensor to capture digital image data; cause the user interface to display, as a live preview feature, the digital image data captured by the image sensor; and/or analyze, using an object detection technique, the digital image data to automatically identify a set of components that are associated with the property. The processor may also be configured to: populate an inventory list with the set of components identified from the digital image data; prepare an application for the property insurance policy, the application indicating the inventory list; and/or transmit, via the communication module, the application to an insurance provider, the insurance provider using the application to generate the quote for the property insurance policy. The electronic device may include additional, less, or alternate functionality, including that discussed elsewhere herein.

Advantages will become more apparent to those of ordinary skill in the art from the following description of the preferred embodiments, which are shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3 depicts an exemplary sequence associated with a walk-through to capture relevant data for an insurance quote via an electronic device in accordance with some embodiments.

DETAILED DESCRIPTION

Figure 1:
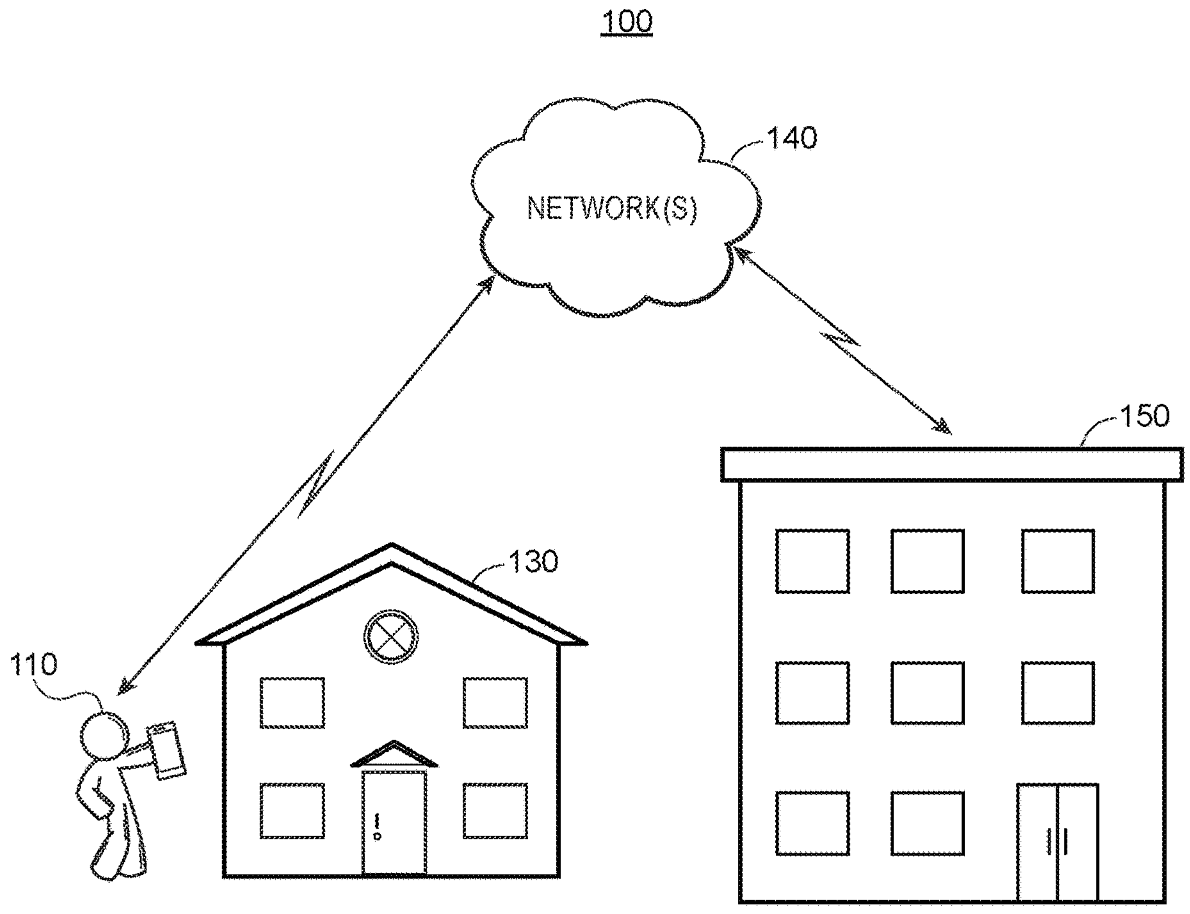
FIG. 1 depicts an exemplary environment including components and entities associated with a computer-implemented method in an electronic device for obtaining an insurance quote for a property insurance policy for an individual.

The novel methods and systems disclosed herein generally relate to techniques and implementations for capturing, cataloging, and/or analyzing structure data and personal property data that may be used to determine replacement cost and/or insurability of a home, property, or business. Replacement cost values (or estimated worth) may be calculated by accessing, capturing, and analyzing data related to various parameters associated with building structures, household fixtures, and personal property. An insurance provider may assess insurability of the property based upon a location of the property and/or other factors.

The present embodiments offer several advantages and benefits over conventional methods of obtaining data for property insurance quotes. Existing quoting procedures require an agent associated with an insurance provider to travel to a property to conduct an inspection or survey. This need for an on-site inspection or survey by the agent may delay the issuance of an insurance quote and/or an insurance policy. Alternatively or additionally, the insurance provider may require the property owner to fill out forms or otherwise manually provide information necessary for an insurance quote. However, the property owner may not have the specialized knowledge needed to accurately identify and/or provide relevant information. In addition, the property owner may not have the knowledge of a professionally-trained agent as it relates to various parameters related to structure components, quality, condition, and/or replacement cost (or actual or estimated worth or value). The systems and methods disclosed herein, therefore, may enable the property owner or other individual associated with the property to utilize an electronic device to capture relevant data for the insurance provider to use to issue an insurance quote for property insurance coverage.

A user may utilize the electronic device (such as a mobile device) to capture various data or information associated with a property that may be relevant for an insurance quote for the property (such as for a current home for the insured, or for a new or different house that they are interested in purchasing) in lieu of an on-site inspection or survey by the agent. In particular, the user may utilize the electronic device at the property to capture the data or information required for the insurance quote. In one implementation, the electronic device may support a dedicated application configured to compile walkthrough instructions associated with the property and communicate the walkthrough instructions to the user. The application may be offered by or otherwise associated with the insurance provider. The electronic device may transmit any captured data or information to a back-end server associated with the insurance provider.

The electronic device may be configured to capture, via an image sensor, digital image data associated with the property. The electronic device may associate the captured data with the property by automatically identifying a location or address of the property, such as by using GPS coordinates. The electronic device may also display the captured digital image data via a user interface to effectively and efficiently guide the user through a walkthrough of the property. In some implementations, the electronic device may analyze the data, populate an associated inventory list, prepare an application for property insurance, and/or transmit the application to an insurance provider.

In other implementations, the electronic device may collect the data, and transmit the data (of house features) to an insurance provider remote server for remote analysis and/or insurance application preparation. The remote server may also generate a quote at the time that the insurance application is prepared, and then transmit that information back to the electronic device for review by the insurance customer. It should be appreciated that the digital image data as described herein may also be referred to as "imaging data" or "digital imaging data". The captured data may also include other types of data, including voice recordings, text entries, voice-to-text data, and/or the like.

The electronic device may analyze the digital image data using an object detection technique to automatically identify and classify a set of components that are associated with the property, such as identifying various features and characteristics of a house. In analyzing the digital image data, the electronic device may identify structural elements, household fixtures, and/or personal property, as well as quantify replacement costs for any identified components. The electronic device may also populate an inventory list with the components and, in some embodiments, prepare an application for the property insurance policy that includes an inventory of those components. The electronic device may further transmit, via a communication module, the application to the insurance provider, which may examine the application and generate the quote for the insurance policy (or may examine a list of features and then prepare an insurance application and/or quote for the insured). In embodiments, the insurance provider may facilitate a purchase transaction of the insurance policy with the user, such as via wireless communication and/or data transmission.

The systems and methods discussed herein address a challenge that is particular to property management. In particular, the challenge relates to a difficulty in ascertaining the presence of components and devices on a property, as well as the values thereof. This is particularly apparent when the components and devices are not cataloged. In conventional circumstances, an agent associated with an insurance company must manually catalog or document the components and devices, which is an inconvenience to property owners and increases insurance costs. In contrast, the systems and methods enable individuals to easily and effectively record the presence of components and devices on a property, generate a corresponding insurance application, and provide the application to an insurance provider for accurate analysis. Therefore, because the systems and methods employ the collection, communication, and analysis of information that is conventionally compiled manually, the systems and methods are necessarily rooted in computer technology in order to overcome the noted shortcomings that specifically arise in the realm of property management.

Similarly, the systems and methods provide improvements in a technical field, namely, data collection and compiling. Instead of the systems and methods merely being performed by hardware components using basic functions, the systems and methods employ complex steps that go beyond the mere concept of simply retrieving and combining data using a computer. In particular, the hardware components dynamically determine walkthrough routes for a property, intelligently guide a user along the walkthrough routes, capture images of the property, dynamically determine whether certain components have been accounted for, populate an inventory list, generate an insurance application, and perform additional actions. This combination of elements further impose meaningful limits in that the operations are applied to improve data collection and compiling by detecting how and when certain actions need to be initiated, and facilitating the actions in a meaningful and effective way.

According to implementations, the systems and methods may support a dynamic, real-time or near-real-time analysis of any captured image data. In particular, the electronic device may dynamically guide a user through a walkthrough of a property, capture appropriate image data, analyze the image data in real time, and dynamically generate an insurance application using information resulting from the analysis, among other functionalities. Accordingly, the user is afforded the benefit of not having to wait for an inspector or agent to record inventor data. Further, the user is afforded the benefit of being able to transmit an insurance application in real time or near real time as the image data is captured and analyzed.

Exemplary System

FIG. 1 illustrates an exemplary system 100 for capturing digital image data associated with a property (also referred to herein as "the system"). The system 100 may include a user 110 and a property 130. The user 110 may use an electronic device 120 to capture various digital image data of the property 130. According to some embodiments, the user 110 may be a property owner, a property manager, a renter of the property 130, an insurance provider representative, an insurance agent, or any other person authorized or otherwise able to capture the digital image data for the property 130. Further, the property 130 may be any type of property such as a house, a townhouse, a condominium, or other dwelling. The property 130 may include one or more outbuildings, such as one or more garages, one or more sheds, or the like.

The electronic device 120 may be a mobile device (such as a smartphone, a laptop, a tablet, a phablet, a smart watch, smart glasses, smart contact lenses, and/or another wearable device), a desktop computer, or any other electronic or computing device capable of capturing digital image data, text data, and/or auditory data, and connecting to various communication networks. The electronic device 120 may be owned by the user 110, or leased or borrowed from an insurance provider. The electronic device 120 may execute a dedicated application configured to facilitate capturing the digital image data associated with the property 130.

The electronic device 120 may be configured with various components capable of capturing video and/or digital photos and storing that digital image data. In particular, the electronic device 120 may include an image sensor for capturing the digital image data and various storage or memory for storing the digital image data. The digital image data may be associated with any visual aspects of the property 130 such as, but not limited to, external building structures, internal rooms and contents, and/or physical condition of the property. The electronic device 120 may also be configured with an audio recording system capable of recording and storing voice and/or other audio as an alternative or in addition to the digital image data. In addition, the electronic device 120 may be configured to convert voice to text and to digitally store the text.

Further, the electronic device 120 may include a user interface configured to present information to the user and receive inputs from the user. In particular, the user interface may prompt the user to enter specific information associated with the property and may present other information for review by the user. The electronic device 120 may analyze the digital image data to identify, measure, qualify, and count structural elements, household fixtures, house or yard features or characteristics, and/or personal property associated with the property 130. In one implementation, the electronic device 120 may display walk-through directions to guide the user 110 throughout the property 130. For example, the walk-through directions may be in the form of progress feedback (e.g., "You are 80% complete with your video walk-through. We suggest capturing your second floor rooms next.").

The electronic device 120 may transmit the captured digital image data to a back-end server 150 via a network or networks 140. In certain embodiments, the network(s) 140 may support any type of data communication via any standard or technology (e.g., GSM, CDMA, TDMA, WCDMA, LTE, EDGE, OFDM, GPRS, EV-DO, UWB, IEEE 802 including Ethernet, WiMAX, Wi-Fi, Bluetooth, and others). The network(s) 140 may also be one or more private or local networks or dedicated frequency bands.

The server 150 may include one or more computers associated with the insurance provider or operated by another organization associated with the insurance provider. The server 150 may be any combination of hardware and software components configured to facilitate and manage various of the functionalities described herein. The server 150 may be physically located at an insurance agency office, a computer facility, an office building, the agent's home, or any other facility authorized by or associated with the insurance provider (such as an insurance provider remote server).

In operation, the server 150 may analyze the digital image data and perform a variety of associated functionalities. In particular, the server 150 may determine a set of estimated replacement costs or values (or estimate actual or current value/worth, such as for antiques, paintings, or other items that may be one of kind), populate a virtual quote form, catalog the possessions or components identified in the digital image data, facilitate any claim adjustments, and/or determine the conditions and premium for an insurance quote. The server 150 may generate an insurance quote that includes insurance coverage for any components, structures, and/or possessions identified in the digital image data captured by the electronic device 120. It should be appreciated that the insurance quote may include various terms and conditions for the underlying insurance policy, various types of protection plans and coverage levels, and/or various associated premiums.

The server 150 may transmit the insurance quote to the electronic device 120. The electronic device 120 may display the insurance quote to the user 110. The electronic device 120 may enable the user to select a desired coverage/premium level, and/or modify and/or accept the insurance quote. In some situations, the entire quoting and acceptance procedure may be completed while the user 110 is on premises of the property 130.

The system 100 therefore provides a significant improvement in response time and flexibility in generating property insurance quotes by utilizing an electronic device 120 to capture data for an insurance quote rather than requiring an agent to conduct an on-site inspection of a property. The system may include additional, less, or alternate components, including those discussed elsewhere herein.

Exemplary Communications

Figure 2:
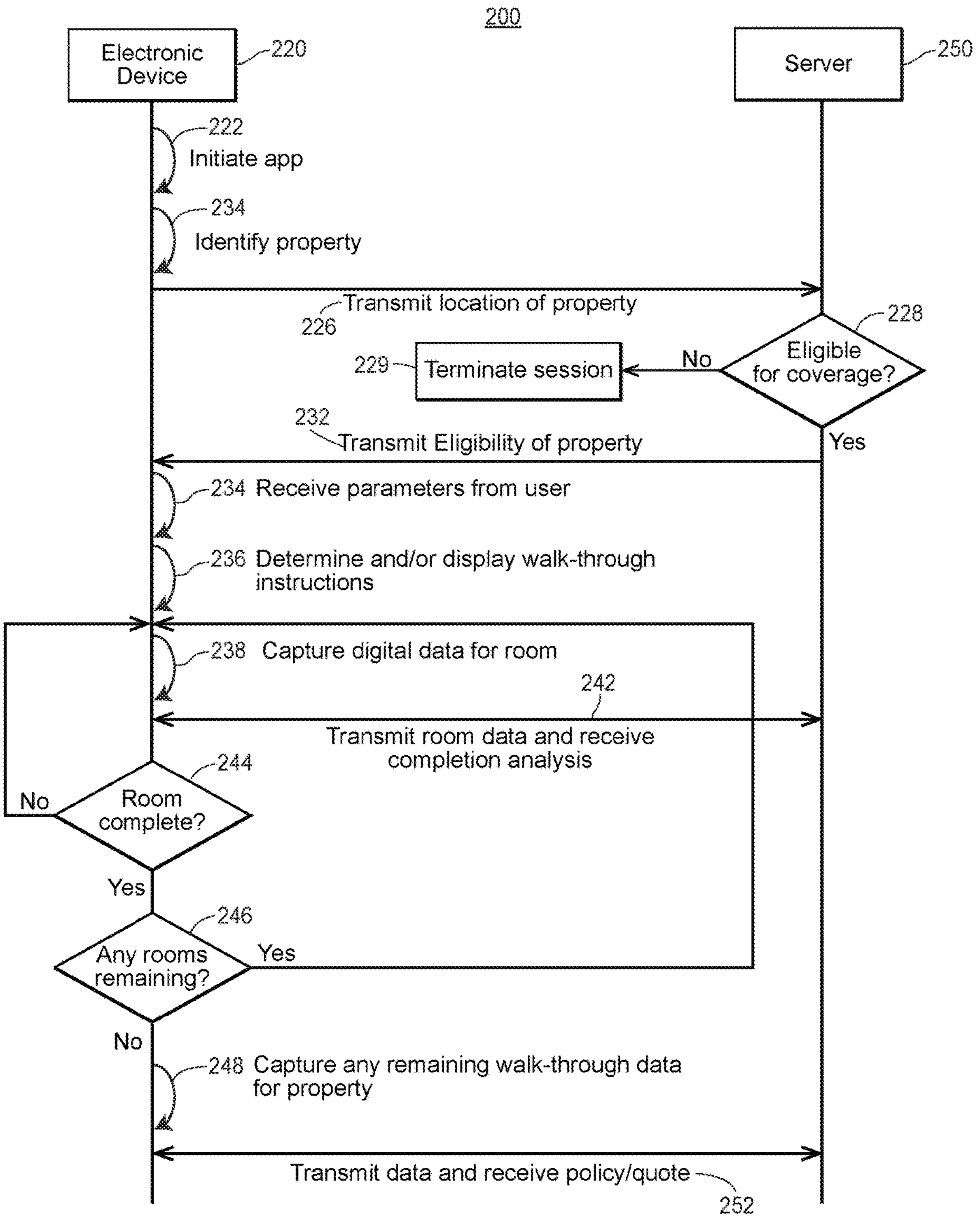
FIG. 2 depicts an exemplary diagram associated with capturing relevant data for an insurance quote via an electronic device in accordance with some embodiments.

FIG. 2 illustrates various exemplary interactions and communications that may take place among a user, an electronic device 220 (such as the electronic device 120 as discussed with respect to FIG. 1), and a server 250 (such as the server 150 as discussed with respect to FIG. 1). Upon arriving at a property, the electronic device 220 may initiate (222) the video quote app. The electronic device 220 may also identify (224) the property. In particular, the electronic device 220 may use a GPS module or other location component to determine the current location of the electronic device 220. The electronic device 220 may then associate that location with the specific location and/or identity of the property. In some implementations, the electronic device 220 may enable the user to enter a street address or other identifying information associated with the property.

The electronic device 220 may transmit (226) the location or identification of the property to the server 250. The server 250 may then determine (228) whether the property is eligible for insurance coverage. It should be appreciated that in some implementations the electronic device 220 may determine whether the property is eligible for insurance coverage. Eligibility of property insurance may be based upon a variety of factors. For example, the property may be subject to frequent flooding or extremely high crime rates. If the property is not insurable ("No"), the insurance quote procedure may end (229). The server 250 may also transmit (232) the eligibility status to the electronic device 220, and the electronic device 220 may notify the user that the property is not eligible.

If the property is insurable ("Yes"), the server 250 may notify (232) the electronic device 220 of the insurability of the property. Subsequently, the electronic device 220 may prompt (234) the user to enter a set of parameters related to the property. It should be appreciated that various parameters related to the property are envisioned. For example, if the property is a house, the parameters for the house may be a number and size of bedrooms, number and size of bathrooms, number of floors, or type and size of basement (e.g., full, partial, finished, etc.). Additional parameters for the overall property may include the number and size of outbuildings, such as garage(s), shed(s), and/or various utility structures, such as cell towers. The electronic device 220 may also enable the user to enter data that identifies or describes the property (e.g., "Two story brick house with attached 2 car garage", or "Single family house with detached garage").

The electronic device 220 may utilize the parameters and other relevant data described above to determine (236) walk-through instructions that may guide the user throughout the property to capture digital imaging data necessary to generate an insurance quote for the property. In some implementations, the electronic device 220 may determine the walk-through instructions from any captured digital image data associated with an exterior of a building on the property. For example, the electronic device 220 may analyze the captured digital image data of the exterior of the house and determine that the house has two floors and a walk-out basement. In addition, the electronic device 220 may analyze the digital image data to determine approximate external dimensions and/or square footage of the house. Further, the electronic device 220 may analyze the digital image data to estimate the number and size of rooms on each floor.

According to embodiments, the walk-through instructions may include an ordering of rooms of the house or sections of the property. The electronic device 220 may determine the ordering according to a pre-determined list or by a sequencing algorithm (e.g., by the complexity of the rooms, by the size of the rooms, alphabetically, or by some other order). Alternatively, the electronic device 220 may enable the user to manually input the ordering, with or without suggestions or prompts by the electronic device 220. It should be appreciated that the walk-through instructions and the ordering thereof may also be determined by additional means not listed above.

The electronic device 220 may display (236) the walk-through sequence for the user to follow in capturing digital image data of the property. The electronic device 220 may display the walk-through sequence in summary or list form (see FIG. 3), or the electronic device 220 may store the sequence and display the sequence one step at a time. Alternatively, the electronic device 220 may embed the walk-through sequence in a continuous video that guides the user with step-by-step instructions. The walk-through instructions may be video (e.g., animated video or actual video of a person or persons providing instructions), audio, text, or any combination thereof. The electronic device 220 may, in some situations, instruct the user to start capturing digital image data for the interior of the house in a particular order as specified in the walk-through instructions. For example, the walk-through instructions may prompt the user to initially capture digital image data of a master bedroom or kitchen of the house.

The electronic device 220 may also instruct the user to capture digital image data for any objects in a given room or section in a certain order. An example of data capture order for the objects in a kitchen may be: the refrigerator, the range or cooktop, the wall oven, the over-the-range microwave or range exhaust hood, and the sink. In another example, the walk-through instructions may prompt the user to start at the top floor of the house. When the user is positioned on the top floor of the property, the electronic device 220 may instruct the user to capture digital image data for the bedroom(s), the bathroom(s), and the closet(s). After capturing data for all the rooms on the top floor, the electronic device 220 may instruct the user to capture digital image data for the next floor below. After electronic device 220 captures the digital image data of the top floor, the electronic device 220 may again prompt the user to go down to the next floor below. The electronic device 220 may repeat the procedure until digital image data is captured for all floors, including the basement.

Figure 5:
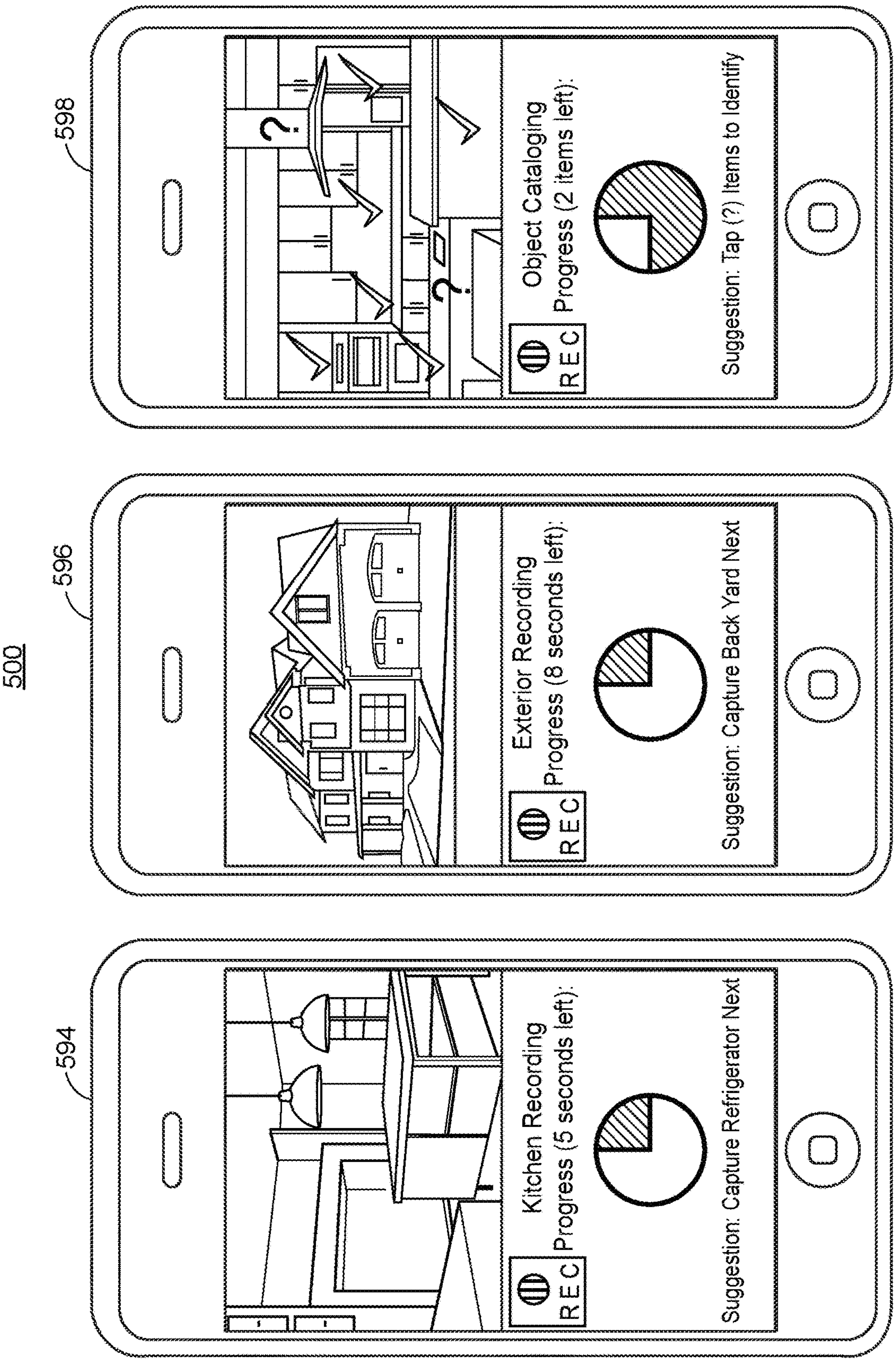
FIG. 5 depicts an exemplary interface associated with capturing relevant data for an insurance quote via an electronic device in accordance with some embodiments.

Alternatively, the electronic device 220 may display a continuous live preview window that may indicate an order or progression of capturing components within the property, where the live preview window (i) may serve to interactively guide the user throughout the property and/or (ii) may display an image or video being captured by a camera mounted on the electronic device, such as depicted by, and discussed in relation to, FIG. 5. For example, after the electronic device 220 has captured digital image data for all of the expected rooms on a floor of the house, the electronic device 220 may prompt the user, “Are there any more rooms on this floor? If so, enter a description of the room, and then begin capturing it.” As another example, after the electronic device 220 has captured and recognized the most common objects in a room, the electronic device 220 may ask the user, “Are there more objects in the room? If so, enter a description of an object and then take a picture of it”. The electronic device 220 may utilize these types of interactions to ensure that data for all rooms and objects in the rooms are captured.

The electronic device 220 may be configured with an imaging sensor to capture the digital image data of the property. The imaging sensor may continuously capture the digital image data during operation of a dedicated application of the electronic device 220. Alternatively, the electronic device 220 may automatically activate the imaging sensor at different points in the walk-through instructions (e.g., when the user walks into a new room). In another implementation, the electronic device 220 may prompt the user to activate the imaging sensor to begin capturing the digital image data. After all the digital image data for a room has been captured, the electronic device 220 may prompt the user to deactivate the imaging sensor. In yet another implementation, the user may manually control operation of the imaging sensor.

As the electronic device 220 captures digital image data for a room (238), the electronic device 220 may also provide feedback to the user. Feedback may be determined by comparing captured digital image data to the expected objects in each room. For example, a kitchen may be expected to have a refrigerator, range, microwave, dishwasher, and cabinets. As another example, a bedroom may be expected to have, as a minimum, a bed and a dresser. A bathroom may be expected to have, as a minimum, a sink, a toilet, and a tub or shower. If the electronic device does not capture or recognize digital image data associated with the minimum expected items, the electronic device 220 may prompt the user to capture digital image data for those items.

Digital image data may be missing for a particular item for several reasons. For example, the object detection feature of the electronic device may not recognize the item, such as if the captured image of the item is not clear enough, or if the item is not included in the list of expected items. For further example, the item may have been a significantly different style or type than the expected style or type for that particular item. The electronic device therefore may not have properly cataloged the item. An additional example may occur when the electronic device is not properly aimed at the item such that the item was not included in the digital image data. It should be appreciated that there may be additional causes for expected items not being captured and properly cataloged.

The provided feedback may be affirmative, with an indication that certain objects were accurately captured and cataloged (e.g., a checkmark, as exemplified in FIG. 5). The feedback may also be corrective, with an indication that more digital image data is required. If any of the expected items are not in the room, the electronic device 220 may prompt the user to enter information explaining the deviation. If an item was captured but not identified, the electronic device 220 may instruct the user to capture digital image data of the item again. Examples of corrective feedback to accurately catalog an item may include instructions to move closer to an item and/or to a certain part of the room, increase lighting, linger for a longer time on a given part of a room, zoom in on an item, steady the shot, etc.

After the electronic device 220 captures digital image data for the first room, the electronic device 220 may transmit (242) the digital image data to the server 250. In some implementations, the electronic device 220 may locally store any captured digital image data or videos of the first room for later transmission to the server 250, such as after the entire walk-through is complete. The electronic device 220 may examine the digital image data to determine (244) if the walk-through for the first room is complete. In other implementations, the server 250 may examine the digital image data to determine if the walk-through for the room is complete.

If the digital image data captured for the room is not complete (“No” output), the electronic device 220 may prompt the user to capture more digital image data (238). If the data capture for the first room is complete (“Yes” output), the electronic device 220 may determine (246) if digital image data needs to be captured for any additional rooms, such as if there are any remaining rooms on the walk-through. If there are no remaining rooms on the walk-through (“No” output), the electronic device 220 may instruct the user to capture any remaining walk-through data for the property (248). If there are remaining rooms on the walk-through (“Yes” output), the electronic device 220 may instruct the user to relocate to the next room of the walk-through and capture (238) the digital image data for that next room.

After the electronic device 220 and/or the server 250 evaluate the digital image data captured for that room for completeness (242, 244), the electronic device 220 may prompt (238) the user to capture any additional digital image data for that room. When the digital image data has been captured for all the rooms (“No” response for 246), the electronic device 220 may prompt the user to capture digital image data or enter additional data (248) for the property. After the electronic device 220 has captured all the data for the property, the electronic device 220 may transmit (252) the captured data to the server 250. The server 250 may analyze the data, generate a property insurance policy/quote, and transmit the policy/quote to the electronic device 220. The electronic device 220 may display the policy/quote to the user and enable the user to select various terms and conditions, propose modifications to the policy/quote, accept the policy/quote, and/or facilitate other functionalities. Additional, fewer, or alternate communications may be used, including those discussed elsewhere herein.

Exemplary Walk-Through Sequence

FIG. 3 illustrates an exemplary walk-through sequence 300 of an example property such as a house that the electronic device may display to the user. The electronic device may display an ordered sequence (e.g., via a user interface) according to various techniques, such as in summary or outline form as depicted in FIG. 3. The walk-through sequence 300 may include a sequence number for each room, which in combination may correspond to the order of the walk-through. The walk-through sequence 300 may also include a column with a room/section/facility description. In some implementations, the electronic device may display the sequences in order, one at a time, without revealing the future steps.

Still referring to FIG. 3, sequence number "1" of the walk-through sequence 300 corresponds to the exterior of the house. In displaying sequence number "1", the electronic device may instruct the user to capture digital image data of the front of the house, the back of the house, the right side of the house, and/or the left side of the house. The exterior walk-through may also include capturing digital image data of the roof, the chimney, the gutters, and the garage doors.

The interior walk-through may include instructions on a room-specific basis, according to what objects may be expected in each type of room. For example, a kitchen walk-through sequence may include expected objects such as a refrigerator, a range or a cooktop, a range exhaust hood or over-the-range microwave, a wall oven, a counter-top microwave, a dishwasher, a ceiling fan, and cabinets. As another example, a bedroom walk-through sequence may include expected objects such as a bed, a dresser, a night-stand, a mirror, and a ceiling fan. In a third example, a dining room walk-through sequence may include expected objects such as a dining room table and chairs, a buffet, a china cabinet, and a chandelier.

It should be appreciated that the electronic device may display walk-through instructions via text, audio, and/or continuous video. The electronic device may also indicate progress or status in the walk-through sequence (e.g., "70% complete"). In addition to detecting objects and cataloging the objects, the electronic device may also calculate measurements associated with the exterior and interior of the house. In particular, the electronic device may measure the exterior dimensions of the house and/or may measure the dimensions of a room, which the electronic device may use to estimate a square footage of each room and of the house as a whole. In some implementations, the electronic device may enable the user to enter dimensions of the room before capturing the objects in the room. The sequence may include additional, less, or alternate actions or instructions, including those discussed elsewhere herein.

Exemplary Method

Figure 4:
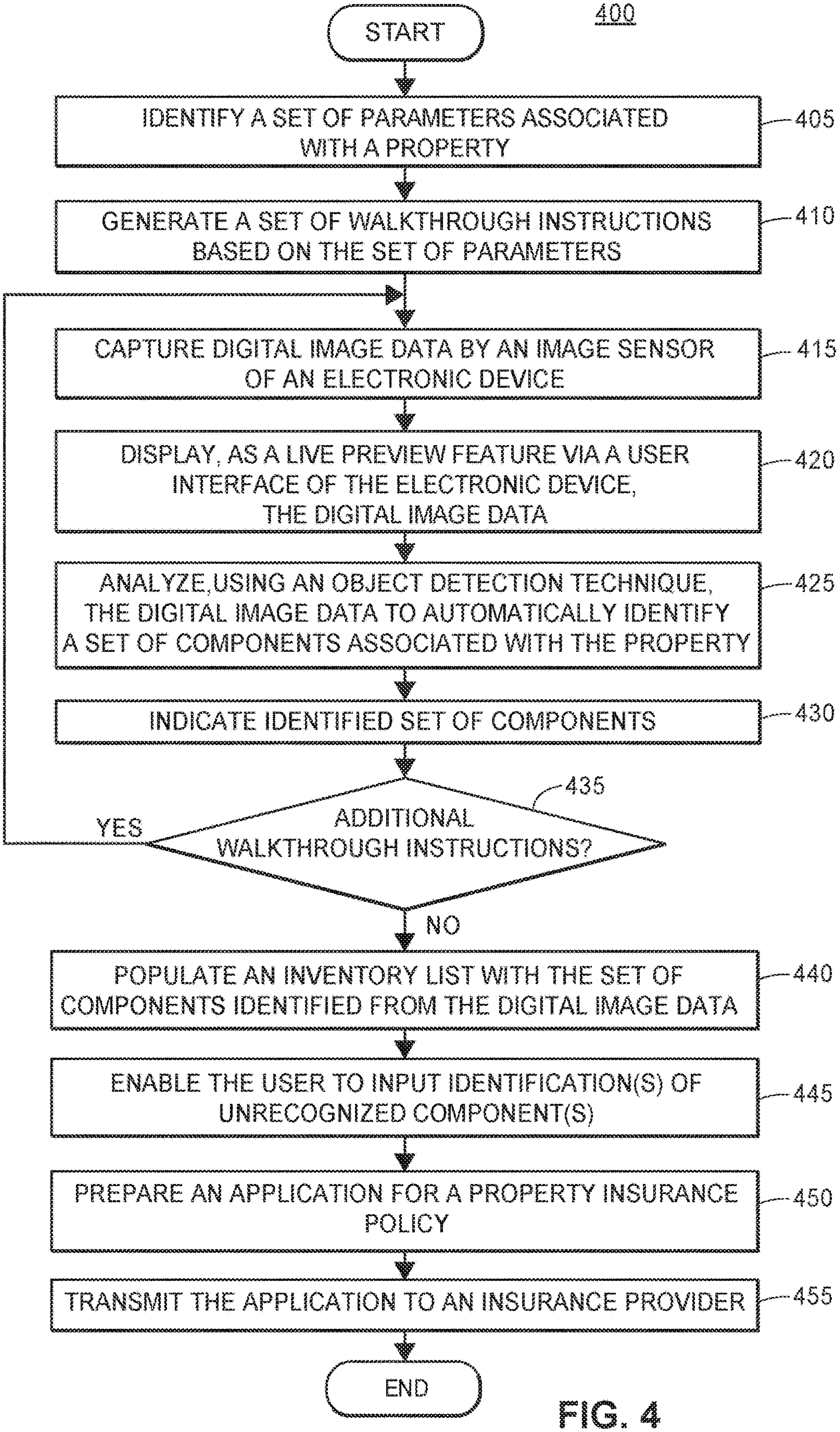
FIG. 4 depicts an exemplary flow diagram of capturing relevant data for an insurance quote via an electronic device in accordance with some embodiments.

Referring to FIG. 4, depicted is a block diagram of an exemplary method 400 of identifying components within a property. According to embodiments, the components may be identified for purposes of obtaining a quote for a property insurance policy for an individual. The method 400 may be facilitated by an electronic device that may be in direct or indirect communication with a back-end server, such as a back-end server associated with an insurance provider. The electronic device may support execution of an application associated with the insurance provider. Further, the electronic device may enable a user or individual (e.g., an owner of the property) to make various selections and facilitate various functionalities.

The method 400 may begin when the electronic device identifies (block 405) a set of parameters associated with the property. In embodiments, the set of parameters may correspond to the number of floors, the number and types of rooms, the number of outbuildings, building construction materials, and/or other information or characteristics that may be relevant to the property. The electronic device may automatically identify the set of parameters, interface with the back-end server to retrieve the set of parameters, and/or may enable the individual to manually input the set of parameters. The electronic device may identify the set of parameters based upon a location of the property and/or other information associated with the property.

The electronic device may generate (block 410) a set of walk-through instructions based upon the set of parameters. In embodiments, the set of walk-through instructions may correspond to an ordering of rooms or areas of the property that the individual may follow when using the electronic device to capture digital image data. The electronic device may capture (block 415) digital image data using an image sensor when the electronic device is located in a particular room or area of the property as specified by the set of walk-through instructions. In capturing the digital image data, the electronic device may display (block 420), as a live preview feature via a user interface, the digital image data. In this regard, the individual is able to view the captured digital image data in real-time and therefore assess different components that may be included in the digital image data.

The electronic device may analyze (block 425), using an object detection technique, the digital image data to automatically identify a set of components associated with the property. The electronic device may also indicate (block 430), via the user interface, the identified set of components. In embodiments, the electronic device may indicate an identified component (e.g., displaying the text "Refrigerator") along with an affirmative indication of the identification (e.g. a check mark).

It should be appreciated that various object detection techniques for identifying the set of components are envisioned, such as various deep learning techniques; auto encoders; multilayer perceptron (MLP) models; various other neural networks including recurrent neural networks (RNN), restricted Boltzmann machines (RBM), self-organizing maps (SOM) or self-organizing feature maps (SOFM), or convolutional neural networks (CNN); and/or other types of models, techniques, algorithms, calculations, or the like. Further, it should be appreciated that various components are envisioned, such as personal property articles, structural elements of the property, fixtures of the property, and/or others. In one embodiment, the electronic device may transmit the digital image data to the back-end server, which may identify the set of components using one or more techniques as discussed herein, and provide an indication of the set of components to the electronic device.

The electronic device may determine (block 435) whether there are additional walk-through instructions. The determination may be based upon whether the individual has navigated through the rooms or areas of the property specified by the set of walk-through instructions. In one implementation, the electronic device may automatically identify its location, associate its location with a currently-accessed area of the property, determine a suggested subsequent area of the property for the individual to navigate, and/or display the indication of the suggested subsequent area. In another implementation, the electronic device may enable the user to manually input completed rooms/areas of the set of walk-through instructions, and/or may determine whether there are additional walk-through instructions accordingly. If the electronic device determines that there are additional walk-through instructions ("YES"), processing may return to block 415 at which the electronic device may capture digital image data in subsequent room/area as specified by the walk-through instructions. The electronic device may also display an indication of the subsequent room/area via the user interface.

In contrast, if the electronic device determines that there are not additional walk-through instructions ("NO"), the electronic device may populate (block 440) an inventory list with the set of components identified from the digital image data. If the electronic device is unable to identify a component from the digital image data, the electronic device may display an indication(s) (e.g., an image) of an unrecognized component(s). The electronic device may also enable (block 445) the user to input an identification(s) of the unrecognized component(s) via the user interface.

The electronic device may prepare (block 450) an application for a property insurance policy for the property. In preparing the application, the electronic device may calculate an estimated replacement cost value (ERCV) for each of the set of components included in the inventory list such that the application may include an aggregate value of the set of components. In some implementations, if one or more of the components is not recognized, the electronic device may update the application to indicate that a manual inspection for the property is needed. Similarly, if a threshold number of components are recognized (or if the number of unrecognized components is below a threshold amount), then the electronic device may update the application to indicate that a manual inspection is not needed.

The electronic device may also transmit (block 455) the application to an insurance provider, which may examine the application and accordingly perform any insurance policy processing. In particular, the insurance policy may calculate a premium or quote for the insurance policy, facilitate modification or acceptance of the insurance policy with the individual, and/or perform other functionalities. The individual may ultimately approve the quote for the insurance policy and the property may be covered by the insurance policy without the need for a manual inspection. The method may include additional, less, or alternate actions, including those discussed elsewhere herein.

Exemplary User Interface

FIG. 5 illustrates exemplary interfaces 500 that may be displayed on the electronic device. The electronic device may support a continuous video, text, audio, or a combination of display methods to interface with the user. The electronic device may display progress via a timer, as depicted in example interface 594. The electronic device may also display a title or name for the room or structure being cataloged. The electronic device may provide suggestions as to what to capture next. The suggestion may instruct the user to zoom in or zoom out or to move closer or farther away.

In addition, the interface 594 may indicate a recording status to remind the user that the electronic device is actively recording data. An additional example interface 596 may illustrate an exterior data capture, where a progress indicator tracks time remaining, and/or a suggestion instructs the user to capture the back yard data next. The interface 596 may also indicate that the record function is active (on). A further example interface 598 illustrates a cataloging progress of items and fixtures in a room (as shown: a kitchen).

A check mark may indicate that the object was successfully cataloged, such as the microwave, oven, sink, and cooktop island. A question mark may indicate an ambiguous object that was not yet cataloged, such as the exhaust hood or an object in the lower part of the picture. The electronic device may provide the user with a suggestion to tap the question marked items and manually identify them. Alternatively, the electronic device may prompt the user to get a closer view of the object, or the electronic device may prompt the user to enter a description via text or audio recording. The exemplary interfaces may include additional, less, or alternate functionality, including that discussed elsewhere herein.

Exemplary Electronic Device

Figure 6:
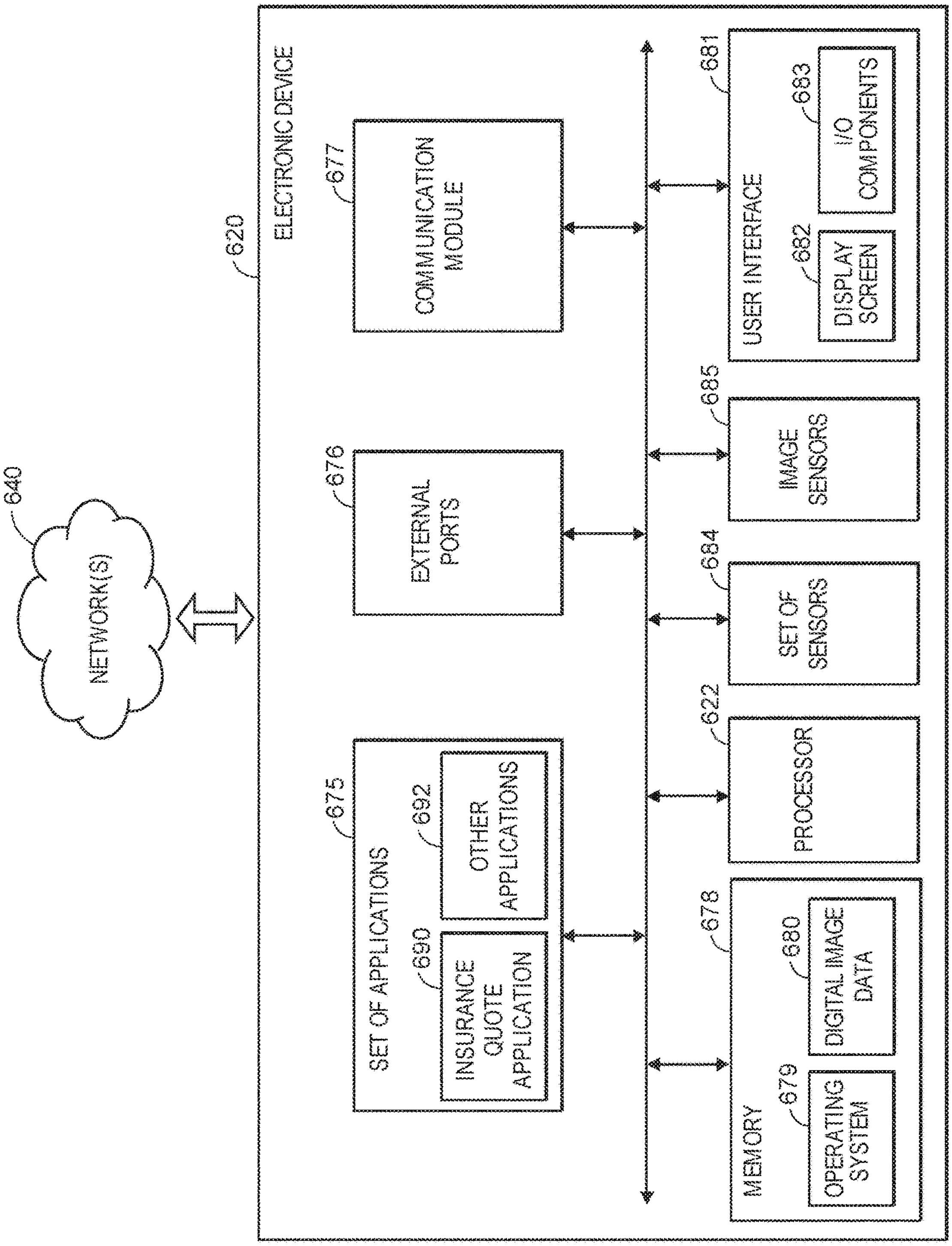
FIG. 6 is a block diagram of an exemplary electronic device in accordance with some embodiments.

FIG. 6 illustrates a diagram of an exemplary electronic device 620 (such as the electronic device 120 discussed with respect to FIG. 1) in which the functionalities as discussed herein may be implemented. It should be appreciated that the electronic device 620 may be configured to connect to public and/or private networks 640, as discussed herein.

The electronic device 620 may include a processor 622 as well as a memory 678. The memory 678 may store an operating system 679 capable of facilitating the functionalities as discussed herein as well as a set of applications 675 (i.e., machine readable instructions). For example, one of the set of applications 675 may be an insurance quote application 690 configured to interface with a back-end server that may be located at an insurance agency. It should be appreciated that one or more other applications 692 are envisioned, such as one or more applications configured to capture digital image data, analyze the data, prepare an insurance policy/quote, and/or present the policy/quote to the user for evaluation and acceptance.

The processor 622 may interface with the memory 678 to execute the operating system 679 and the set of applications 675. According to some embodiments, the memory 678 may also store digital image data 680 that is captured by the electronic device 620. In some implementations, the insurance quote application 690 may store the digital image data 680 in the memory 678. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 620 may further include a communication module 677 configured to communicate data via one or more networks 640. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676.

Further, the communication module 677 may include a short-range network component (e.g., an RFID reader) configured for short-range network communications. For example, the communication module 677 may receive location data via the network 640 or an external GPS network. For further example, the communication module 677 may transmit data to and receive data from a back-end server via the network 640. The electronic device 620 may further include a set of sensors 684 (e.g., a location module, an audio recording system, an accelerometer, a gyroscope, etc.). In addition, the electronic device 620 may include an image sensor 685 for capturing digital image data.

The electronic device 620 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones). According to some embodiments, the user may access the electronic device 620 via the user interface 681 to make various selections, log into any of the set of applications 675, and/or perform other functions. In some embodiments, the electronic device 620 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like)

having computer-readable program code embodied therein, wherein the computer-readable program code may be adapted to be executed by the processor 622 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources. The electronic device may include additional, less, or alternate components and functionality, including that discussed elsewhere herein.

Exemplary Server

Figure 7:
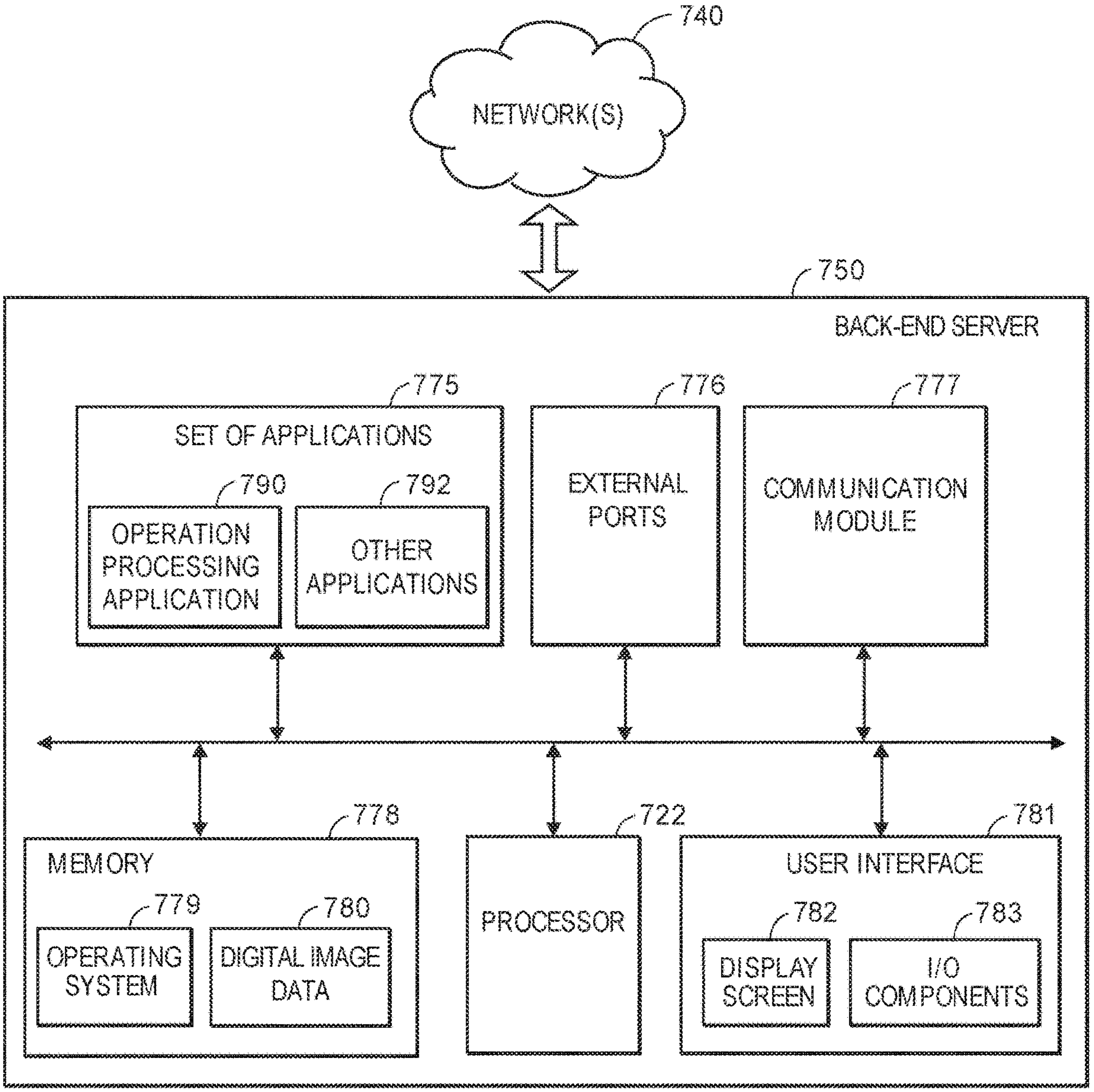
FIG. 7 is a block diagram of an exemplary back-end server in accordance with some embodiments.

FIG. 7 illustrates a diagram of an exemplary back-end server 750 (such as the back-end server 150 as discussed with respect to FIG. 1) in which the functionalities as discussed herein may be implemented. It should be appreciated that the server 750 may be associated with an insurance provider, as discussed herein.

The server 750 may include a processor 722, as well as a memory 778. The memory 778 may store an operating system 779 capable of facilitating the functionalities as discussed herein as well as a set of applications 775 (i.e., machine readable instructions). For example, one of the set of applications 775 may be an operation processing application 790 configured to analyze digital image data and determine completeness of data capture for rooms or buildings. It should be appreciated that other applications 792 are envisioned.

The processor 722 may interface with the memory 778 to execute the operating system 779 and the set of applications 775. According to some embodiments, the memory 778 may also store digital image data 780 received from the electronic device. Although not shown in FIG. 7, the memory 778 may also store location data such that the operation processing application 790 may continuously update the location of the electronic device. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 750 may further include a communication module 777 configured to communicate data via one or more networks 740. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may receive, via the network 740, digital image data from the electronic device. The server 750 may further include a user interface 781 configured to present information to a user at the back-end and/or receive inputs from the user at the back-end. As shown in FIG. 7, the user interface 781 may include a display screen 782 and I/O components 783 (e.g., ports, capacitive or resistive touch sensitive input panels, keys, buttons, lights, LEDs, speakers, microphones). According to some embodiments, the back-end user may access the server 750 via the user interface 781 to analyze and/or to process the digital image data captured by the electronic device and/or perform other functions. In some embodiments, the server 750 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 722 (e.g., working in connection with the operating system 779) to facilitate the functions as described herein. In this regard, the program code may be implemented in any desired language, and/or may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources. The server may include additional, less, or alternate functionality, including that discussed elsewhere herein.

Exemplary Method

In one aspect, a computer-implemented method in an electronic device of identifying components within a property for obtaining a quote for a property insurance policy for an individual may be provided. The method may include (1) capturing digital image data by an image sensor of the electronic device; (2) displaying, as a live preview feature via a user interface of the electronic device, the digital image data captured by the image sensor; (3) analyzing, by a processor using an object detection technique, the digital image data to automatically identify a set of components that are associated with the property; (4) populating an inventory list with the set of components identified from the digital image data; (5) preparing, by the processor, an application for the property insurance policy, the application indicating the inventory list; and/or (6) transmitting, via a communication module of the electronic device, the application to an insurance provider, the insurance provider using the application to generate the quote for the property insurance policy. As a result, the online customer experience is enhanced. The method may include additional, less, or alternate actions, including those discussed elsewhere herein.

For instance, preparing the application for the property insurance policy may include calculating an estimated replacement cost value (ERCV) for each of the set of components included on the inventory list. Analyzing the digital image data may include automatically identifying at least one of: a set of personal property articles, a set of structural elements of the property, and a set of fixtures of the property. Additionally or alternatively, analyzing the digital image data may include transmitting the digital image data to the insurance provider via the communication module, the insurance provider configured to identify the set of components that are associated with the property; and/or receiving, from the insurance provider, an indication of the set of components.

The method may include identifying a location of the electronic device; associating the location of the electronic device with a currently-accessed area of the property; determining, based upon the currently-accessed area of the property, a suggested subsequent area of the property through which the user may navigate; and/or displaying, via the user interface, an indication of the suggested subsequent area of the property.

The method may include identifying a set of parameters associated with the property; and/or determining, based upon the set of parameters, a set of walk-through instructions associated with capturing the digital image data. The method may include, in response to analyzing the digital image data: examining the set of walk-through instructions to identify a subsequent area of the property through which the user may navigate; and/or displaying, via the user interface, an indication of the subsequent area of the property.

The method may include, responsive to identifying one of the set of components, displaying, via the user interface, an indication that the one of the set of components has been identified. The method may include displaying, via the user interface, an indication of an unrecognized component that is not recognized using the object detection technique; enabling the individual to input, via the user interface, an identification of the unrecognized component; and/or further populating the inventory list with the identification of the unrecognized component. The method may include determining that at least one of the set of components is not recognized; and/or updating the application for the property insurance policy to indicate that a manual inspection for the property is needed.

Exemplary Electronic Device

In one aspect, an electronic device for identifying components within a property for obtaining a quote for a property insurance policy may be provided. The device may include a communication module configured to communicate data; an image sensor; a memory storing a set of computer-executable instructions; a user interface configured to display content and receive user selections; and/or a processor adapted to interface with the communication module, the memory, and the user interface, and configured to execute the set of computer-executable instructions to cause the processor to: cause the image sensor to capture digital image data, cause the user interface to display, as a live preview feature, the digital image data captured by the image sensor, analyze, using an object detection technique, the digital image data to automatically identify a set of components that are associated with the property, populate an inventory list with the set of components identified from the digital image data, prepare an application for the property insurance policy, the application indicating the inventory list, and/or transmit, via the communication module, the application to an insurance provider, the insurance provider using the application to generate the quote for the property insurance policy. The device may include additional, less, or alternate functionality, including that discussed elsewhere herein.

For instance, to prepare the application for the property insurance policy, the processor may be configured to calculate an estimated replacement cost value (ERCV) for each of the set of components included on the inventory list. To analyze the digital image data, the processor may be configured to analyze the digital image data to automatically identify at least one of: a set of personal property articles, a set of structural elements of the property, and a set of fixtures of the property. To analyze the digital image data, the processor may be configured to: transmit the digital image data to the insurance provider via the communication module, the insurance provider configured to identify the set of components that are associated with the property, and/or receive, from the insurance provider via the communication module, an indication of the set of components.

The processor may be further configured to: identify a location of the electronic device, associate the location of the electronic device with a currently-accessed area of the property, determine, based upon the currently-accessed area of the property, a suggested subsequent area of the property through which the user may navigate, and/or cause the user interface to display an indication of the suggested subsequent area of the property.

The processor may be configured to: identify a set of parameters associated with the property, and/or determine, based upon the set of parameters, a set of walk-through instructions associated with capturing the digital image data. The processor may be configured to, in response to analyzing the digital image data: examine the set of walk-through instructions to identify a subsequent area of the property through which the user may navigate, and/or cause the user interface to display an indication of the subsequent area of the property. The processor may be further configured to, in response to identifying one of the set of components: cause the user interface to display an indication that the one of the set of components has been identified.

The processor may be configured to: cause the user interface to display an indication of an unrecognized component that is not recognized using the object detection technique, enable the individual to input, via the user interface, an identification of the unrecognized component, and/or further populate the inventory list with the identification of the unrecognized component. The processor may be configured to: determine that at least one of the set of components is not recognized, and/or update the application for the property insurance policy to indicate that a manual inspection for the property is needed.

Exemplary Computer-Implemented Method

In one aspect, a computer-implemented method in a mobile device of identifying components or features within or associated with a house for obtaining a quote for a homeowners or other insurance policy for an individual may be provided. The method may include (1) capturing digital image data or video by an image sensor or camera mounted within the mobile device; (2) displaying, as a continuous video stream (or other live preview feature) via a user interface of the mobile device, the digital image data or video captured by the image sensor or camera; (3) analyzing, by a processor (mounted within the mobile device) using an object detection, optical character recognition, or object recognition technique, the digital image data to automatically identify a component or a feature associated with the interior or exterior of the house; (4) transmitting, via a communication module and/or transceiver of the mobile device, the digital image data or video and/or data indicating the component or feature identified to an insurance provider remote server, the insurance provider remote server using the data received to generate the quote for the homeowners insurance policy; (5) receiving, via a communication module and/or transceiver of the mobile device, the quote for the homeowners insurance policy from the insurance provider remote server; and/or (6) displaying or presenting, on a display of the mobile device, the quote for the homeowners insurance policy generated from computer analysis of the digital image data or video to facilitate enhancing the online customer experience. The method may include additional, less, or alternate actions, including those discussed elsewhere herein.

For instance, the method may include populating an inventory list, by the processor of the mobile device, with a set of components or features identified from the digital image data or video; preparing, by the processor of the mobile device, a virtual application (or other form) for the property insurance policy, the application indicating the inventory list; and/or transmitting, via a communication module or transceiver of the mobile device, the virtual application and/or inventory list to the insurance provider remote server, the insurance provider remote server using the virtual application and/or inventory list to generate the quote for the homeowners insurance policy. Preparing the virtual application for the homeowners insurance policy may include calculating an estimated replacement cost value (ERCV) for each of the set of components or features included on the inventory list. In one embodiment, digital image data is also captured of personal belongings, and the insurance provider also calculates an estimated replacement cost value (ERCV) for each personal belonging; and generates a quote for a personal articles insurance policy.

Analyzing the digital image data or video may include automatically identifying at least one of: a set of personal property articles, a set of structural elements of the property, and a set of fixtures of the property. Analyzing the digital image data or video may include transmitting the digital image data or video to the insurance provider remote server via the communication module and/or transceiver of the mobile device, the insurance provider remote server configured to identify the set of components that are associated with the property; and/or receiving, from the insurance provider remote server, an indication of the set of components.

The method may include identifying, via one or more processors, a location of the mobile device (such as from a GPS location of the mobile device); associating, via the one or more processors, the location of the mobile device with a currently-accessed area of the property; determining, via the one or more processors, based upon the currently-accessed area of the property, a suggested subsequent area of the property for which the individual is to navigate and take further digital images of; and/or displaying, via the user interface of the mobile device, an indication of the suggested subsequent area of the property to be photographed or video-taped.

The method may include identifying, via one or more processors, a set of parameters associated with the house; and/or determining, via one or more processors, based upon the set of parameters, a set of walk-through instructions associated with capturing the digital image data or video. The method may include, in response to analyzing the digital image data: examining the set of walk-through instructions to identify a subsequent area of the property through which the user may navigate; and/or displaying, via the user interface of the mobile device, an indication of the subsequent area of the property. The method may include responsive to identifying one of the set of components, displaying, via the user interface, an indication that the one of the set of components has been identified. The method may include displaying, via the user interface, an indication of an unrecognized component or feature that is not recognized using the object detection, object recognition, or optical character recognition technique; enabling the individual to input, via the user interface, an identification of the unrecognized component; and/or further populating the inventory list with the identification of the unrecognized component or feature. The method may also include determining that at least one of the set of components or features is not recognized; and/or updating the application for the property insurance policy to indicate that a manual inspection for the property is needed.

Exemplary Computer-Implemented Methods

In one aspect, a computer-implemented method of providing an insurance quote may be provided. The method may include (1) providing, via one or more processors (such as processors within a mobile device), a continuous video stream on a mobile device display; (2) identifying, via the one or more processors, one or more household features or characteristics being captured by the continuous video stream (such as via object detection, object recognition, or optical character recognition techniques); (3) displaying or overlaying, via the one or more processors, a check icon on each household feature or characteristic that is positively categorized as having a replacement cost; (4) displaying or overlaying, via the one or more processors, a second icon on each household feature or characteristic that is not positively categorized and that needs additional video to be properly categorized or recognized; (5) transmitting, via the or more processors, data regarding the categorization or identification of the one or more household features to a remote server associated with an insurance provider; (6) receiving, via the one or more processors, a quote for an insurance product based upon the categorization or identification of the one or more household features from the remote server; and/or (7) displaying, via the one or more processors, the insurance quote on the mobile device display for the insured's review, modification, or approval such that more accurate matching of insurance risk to insurance cost is facilitated. The method may include additional, less, or alternate actions, including those discussed elsewhere herein.

For instance, the method may include transmitting, via the one or more processors, a GPS (Global Positioning System) location to the remote server to facilitate the remote server verifying that the house is eligible for homeowners insurance. The method may include transmitting, via the one or more processors, a GPS (Global Positioning System) location to the remote server to facilitate the remote server determining that a house actually exists at that location, or verifying the condition of the house at that location, such as by searching third party databases, websites, or real estate listings.

The method may include audibly or visually directing the insured, via the one or more processors, to move closer to a household feature or characteristic that is presently unrecognizable from computer analysis of the current video stream.

In another aspect, a computer-implemented method of identifying household features may be provided. The method may include (1) presenting, via one or more processors, a continuous video stream of a house, or portion thereof, on a display of a mobile device; (2) providing, via the one or more processors, a first visual indication (such as a green check mark icon) for each household feature that is positively identified or characterized, and/or which a replacement cost has been determined (such as superimposing the first visual indication over each household feature identified within the continuous video stream or digital image(s)); (3) providing, via the one or more processors, a second visual indication (such as a red check mark icon) for each household feature that is not positively identified or characterized, and/or which a replacement cost has not been determined (such as superimposing the second visual indication over each household feature identified within the continuous video stream or digital image(s)) to indicate to the user that addition video for those household features is needed to help identify or determine replacement costs for those items; (4) transmitting, via the one or more processors, data related to the identification and/or characterization of the household features to a remote server associated with an insurance provider to facilitate the remote server estimating a quote for an insurance product based upon the household features identified; (5) receiving, via the one or more processors, an insurance quote from the remote server based upon the household features identified; and/or (6) presenting, via the one or more processors, the insurance quote on the mobile device display for a user's review, approval, or modification to facilitate enhancing the online customer experience. The method may include additional, less, or alternate actions, including those discussed elsewhere herein.

For instance, the method may include transmitting, via the one or more processors and/or an associated transceiver, a GPS (Global Positioning System) location to the remote server to facilitate the remote server verifying that the house is eligible for homeowners insurance. The method may include transmitting, via the one or more processors, a GPS (Global Positioning System) location to the remote server to facilitate the remote server verifying that a house actually exists at that location, or the verifying the condition of the house at that location, such as by searching third party databases, websites, or real estate listings. The method may include audibly or visually directing, via the one or more processors, the user to move closer to a household feature that is presently unrecognizable via computer analysis of the current video stream or digital image(s).

In another aspect, a computer-implemented method of identifying household features may be provided. The method may include (1) presenting, via one or more processors, a continuous video stream (or digital image(s)) of a house, or portion thereof, on a display of a mobile device; (2) dynamically identifying, via the one or more processors, a visual indication (such as a green check mark icon) for a household feature that is positively identified or characterized, and/or which a replacement cost has been determined (such as superimposing the visual indication or icon over the household feature identified within the continuous video stream (or other digital image(s)); (3) providing, via the one or more processors, audible or visual directions to the user to facilitate capturing video or digital images of additional household features (such as "Please move to another room;" "Move to the kitchen;" "Move to the master bath or bedroom;" etc.); (4) transmitting, via the one or more processors, data related to the identification and/or characterization of the household features to a remote server associated with an insurance provider to facilitate the remote server estimating a quote for an insurance product (such as homeowners or renters insurance policy, or a personal articles insurance policy) based upon the household features identified; (5) receiving, via the one or more processors, an insurance quote from the remote server based upon the household features identified and/or characterized; and/or (6) presenting, via the one or more processors, the insurance quote on the mobile device display for a user's review, approval, or modification to facilitate enhancing the online customer experience. The method may include additional, less, or alternate actions, including those discussed elsewhere herein.

Exemplary Graphical User Interface

In one aspect, a graphical user interface for capturing household features for insurance-related purposes may be provided. The graphical user interface may include or present: (1) a continuous video stream showing an area of a house; (2) a check icon overlaid or superimposed on each household feature that is positively categorized or characterized, and/or for which a replacement cost is positively determined; and/or (3) another icon overlaid or superimposed on each household feature that is not positively categorized or characterized, and/or for which a replacement cost is not positively determined to provide a visual indication to a user that additional or better video is needed for those household features yet to be positively identified. The graphical user interface may present audible or visual directions to a user to capture video of additional household features, such as directions to move to another area inside or outside of a house, or move closer to various household features and get additional digital images/video. The graphical user interface may further present an insurance quote that was generated based upon the captured video (or digital images) and/or household features (and/or replacement costs or estimated value thereof) determined or identified from computer analysis of the captured video (or digital images). The graphical user interface may include additional, less, or alternate functionality, including that discussed elsewhere herein, such as depicted in FIG. 5.

ADDITIONAL CONSIDERATIONS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Any reference to "home" or "property" is meant to be exemplary and not limiting. The systems and methods described herein may be applied to any property, such as offices, farms, lots, parks, and/or other types of properties or buildings. Accordingly, "homeowner" may be used interchangeably with "property owner."

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For instance, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For instance, where the hardware modules comprise a general-purpose processor configured using software, the general-purpose processor may be configured as respective different hardware modules at different times. Software may accordingly configure a processor, for instance, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for instance, through the storage and retrieval of information in memory structures to which the multiple hardware modules have access. For instance, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For instance, at least some of the operations of a method may be performed by one or more processors or processor-implemented hardware modules. The performance of certain of the operations may be distributed among the one or more processors, not only residing within a single machine, but deployed across a number of machines. In some exemplary embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for instance, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), personal articles, and/or other types of insurance products. In embodiments as described herein, the insurance providers process claims related to insurance policies that cover one or more properties (e.g., homes, automobiles, personal property), although processing other insurance policies is also envisioned.

The terms “insured,” “insured party,” “policyholder,” “customer,” “claimant,” and “potential claimant” are used interchangeably herein to refer to a person, party, or entity (e.g., a business or other organizational entity) that is covered by the insurance policy, e.g., whose insured article or entity (e.g., property, life, health, auto, home, business) is covered by the policy. A “guarantor,” as used herein, generally refers to a person, party or entity that is responsible for payment of the insurance premiums. The guarantor may or may not be the same party as the insured, such as in situations when a guarantor has power of attorney for the insured. An “annuitant,” as referred to herein, generally refers to a person, party or entity that is entitled to receive benefits from an annuity insurance product offered by the insuring party. The annuitant may or may not be the same party as the guarantor.

As used herein, the terms “comprises,” “comprising,” “includes,” “including,” “has,” “having” or any other variation thereof, are intended to cover a non-exclusive inclusion. For instance, a process, method, article, or apparatus that comprises a list of elements is not necessarily limited to only those elements but may include other elements not expressly listed or inherent to such process, method, article, or apparatus.

In addition, use of the “a” or “an” are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method in an electronic device of identifying components within a property by analyzing digital image data, the method comprising:

capturing digital image data by an image sensor of the electronic device, the digital image data depicting a portion of the property;

displaying, as a live preview feature via a user interface of the electronic device, the digital image data captured by the image sensor;

analyzing, by a processor using an object detection technique, the digital image data to automatically identify a first set of components present in the portion of the property; and displaying, in the user interface and using an augmented reality overlay on a live video image according to the digital image data captured by the image sensor, (i) a first set of indications respectively associated with the first set of components, and (ii) a second set of indications respectively associated with a second set of components not yet identified, wherein the augmented reality overlay is generated using sensor data from at least one additional sensor of the electronic device.

2. The computer-implemented method of claim 1, wherein analyzing the digital image data comprises:

analyzing the digital image data to automatically identify at least one of: a set of personal property articles, a set of structural elements of the property, and a set of fixtures of the property.

3. The computer-implemented method of claim 1, wherein analyzing the digital image data comprises:

transmitting the digital image data to a remote server via a communication module, the remote server configured to identify the first set of components present in the portion of the property; and receiving, from the remote server via the communication module, an indication of the first set of components.

4. The computer-implemented method of claim 1, further comprising:

identifying a location of the electronic device; and associating the location of the electronic device with the portion of the property.

5. The computer-implemented method of claim 1, further comprising:

identifying a set of parameters associated with the property; and determining, based upon the set of parameters, a set of walk-through instructions associated with capturing the digital image data.

6. The computer-implemented method of claim 5, further comprising:

examining the set of walk-through instructions to identify the portion of the property; and displaying, via the user interface, an indication of the portion of the property.

7. The computer-implemented method of claim 1, further comprising:

receiving, via the user interface, an identification of a component of the second set of components.

8. The computer-implemented method of claim 1, further comprising:

populating an inventory list with the first set of components identified from the digital image data.

9. The computer-implemented method of claim 1, wherein displaying the first set of indications and the second set of indications comprises:

displaying, in the user interface and using the augmented reality overlay on the live video image according to the digital image data captured by the image sensor, (i) a first set of icons respectively associated with the first set of components, and (ii) a second set of icons, different from the first set of icons, respectively associated with a second set of components not yet identified.

10. The computer-implemented method of claim 1, further comprising:

calculating an estimated replacement cost value (ERCV) for each of the first set of components.

11. An electronic device for identifying components within a property by analyzing digital image data, comprising:

an image sensor;

at least one additional sensor;

a memory storing a set of computer-executable instructions;

a user interface configured to display content and receive user selections; and a processor interfacing with the image sensor, the at least one additional sensor, the memory, and the user interface, and configured to execute the set of computer-executable instructions to cause the processor to:

cause the image sensor to capture digital image data depicting a portion of the property, cause the user interface to display, as a live preview feature, the digital image data captured by the image sensor, analyze, using an object detection technique, the digital image data to automatically identify a first set of components present in the portion of the property, and cause the user interface to display, using an augmented reality overlay on a live video image according to the digital image data captured by the image sensor, (i) a first set of indications respectively associated with the first set of components, and (ii) a second set of indications respectively associated with a second set of components not yet identified, wherein the augmented reality overlay is generated using sensor data from the at least one additional sensor.

12. The electronic device of claim 11, wherein to analyze the digital image data, the processor is configured to execute the set of computer-executable instructions to further cause the processor to:

analyze the digital image data to automatically identify at least one of: a set of personal property articles, a set of structural elements of the property, and a set of fixtures of the property.

13. The electronic device of claim 11, further comprising:

a transceiver;

wherein to analyze the digital image data, the processor is configured to execute the set of computer-executable instructions to further cause the processor to:

transmit the digital image data to a remote server via the transceiver, the remote server configured to identify the first set of components present in the portion of the property, and receive, from the remote server via the transceiver, an indication of the first set of components.

14. The electronic device of claim 11, wherein the processor is configured to execute the set of computer-executable instructions to further cause the processor to:

identifying a location of the electronic device; and associating the location of the electronic device with the portion of the property.

15. The electronic device of claim 11, wherein the processor is configured to execute the set of computer-executable instructions to further cause the processor to:

identifying a set of parameters associated with the property; and determining, based upon the set of parameters, a set of walk-through instructions associated with capturing the digital image data.

16. The electronic device of claim 15, wherein the processor is configured to execute the set of computer-executable instructions to further cause the processor to:

examining the set of walk-through instructions to identify the portion of the property; and displaying, via the user interface, an indication of the portion of the property.

17. The electronic device of claim 11, wherein the processor is configured to execute the set of computer-executable instructions to further cause the processor to:

receiving, via the user interface, an identification of a component of the second set of components.

18. The electronic device of claim 11, wherein the processor is configured to execute the set of computer-executable instructions to further cause the processor to:

populating an inventory list with the first set of components identified from the digital image data.

19. The electronic device of claim 11, wherein to cause the user interface to display the first set of indications and the second set of indications, the processor is configured to execute the set of computer-executable instructions to further cause the processor to:

cause the user interface to display, using the augmented reality overlay on the live video image according to the digital image data captured by the image sensor, (i) a first set of icons respectively associated with the first set of components, and (ii) a second set of icons, different from the first set of icons, respectively associated with a second set of components not yet identified.

20. The electronic device of claim 11, wherein the processor is configured to execute the set of computer-executable instructions to further cause the processor to:

calculating an estimated replacement cost value (ERCV) for each of the first set of components.

* * * * *